United States Patent
Zhu et al.

(10) Patent No.: US 7,592,716 B2
(45) Date of Patent: Sep. 22, 2009

(54) INFORMATION HANDLING SYSTEM INCLUDING A BATTERY THAT REDUCES A VOLTAGE FLUCTUATION

(75) Inventors: Guangyong Zhu, Austin, TX (US); John J. Breen, Austin, TX (US); David Jose Toland, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 10/915,230

(22) Filed: Aug. 10, 2004

(65) Prior Publication Data

US 2006/0033470 A1    Feb. 16, 2006

Related U.S. Application Data

(63) Continuation-in-part of application No. 10/628,921, filed on Jul. 29, 2003, now Pat. No. 7,545,120.

(51) Int. Cl.
*H02J 3/32* (2006.01)
*H02J 7/00* (2006.01)
*H02J 7/04* (2006.01)

(52) U.S. Cl. ............ 307/48; 307/46; 320/128; 320/137; 320/162

(58) Field of Classification Search ........ 307/64–66, 307/80, 43–45, 46, 48; 320/137–138, 128, 320/162
See application file for complete search history.

(56) References Cited

U.S. PATENT DOCUMENTS

| | | | |
|---|---|---|---|
| 4,728,808 A * | 3/1988 | Bet-Esh et al. ............. 307/66 |
| 5,122,729 A | 6/1992 | Itoga et al. |
| 5,422,562 A * | 6/1995 | Mammano et al. ......... 323/282 |
| 5,796,238 A * | 8/1998 | Hiratsuka et al. .......... 320/112 |
| 5,838,141 A | 11/1998 | Sengupta et al. |
| 5,847,546 A * | 12/1998 | Sengupta et al. ........... 320/144 |
| 5,864,220 A | 1/1999 | Reipur et al. |
| 5,903,764 A | 5/1999 | Shyr et al. |
| 5,941,714 A | 8/1999 | Gorbet et al. |
| 5,942,885 A | 8/1999 | Nemoto et al. |
| 5,994,878 A | 11/1999 | Ostergaard et al. |
| 5,994,885 A | 11/1999 | Wilcox et al. |
| 6,025,698 A | 2/2000 | Kim et al. |
| 6,104,162 A | 8/2000 | Sainsbury et al. |
| 6,160,722 A * | 12/2000 | Thommes et al. ........... 363/37 |
| 6,184,660 B1 | 2/2001 | Hatular |
| 6,184,731 B1 | 2/2001 | Nagaoka |
| 6,268,714 B1 | 7/2001 | Yang |
| 6,275,011 B1 | 8/2001 | Yang |

(Continued)

*Primary Examiner*—Akm E Ullah
*Assistant Examiner*—Richard V Muralidar
(74) *Attorney, Agent, or Firm*—Haynes and Boone, LLP

(57) ABSTRACT

In a first embodiment, an information handling system ("IHS") includes a processor. The IHS also includes a power rail coupled to the processor. The power rail supplies power, from a power adapter, to the processor. The IHS further includes a battery, that in response to a voltage fall on the power rail, supplies supplemental power to the power rail. In a second embodiment, an IHS includes a processor. The IHS also includes a power rail coupled to the processor. The power rail supplies power, from a power adapter, to the processor. The IHS further includes a battery, that in response to a voltage rise on the power rail, suppresses or sinks power supplied by the power adapter to the power rail.

14 Claims, 5 Drawing Sheets

U.S. PATENT DOCUMENTS

| | | | |
|---|---|---|---|
| 6,377,030 B1 * | 4/2002 | Asao et al. | 320/161 |
| 6,509,717 B2 | 1/2003 | Lee | |
| 6,522,105 B2 | 2/2003 | Kodama et al. | |
| 6,661,200 B2 * | 12/2003 | Odaohhara | 320/132 |
| 7,183,748 B1 | 2/2007 | Unno et al. | |
| 7,365,952 B2 * | 4/2008 | Sato | 361/90 |

* cited by examiner

100

INFORMATION HANDLING SYSTEM INCLUDING A BATTERY THAT REDUCES A VOLTAGE FLUCTUATION

CROSS REFERENCE TO RELATED PATENT APPLICATIONS

This patent application is a continuation-in-part of and claims priority to the related U.S. patent application entitled "AC-DC ADAPTER AND BATTERY CHARGER INTEGRATION SCHEME", Ser. No. 10/628,921, naming Breen, John J., et al. as inventors, which is incorporated herein by reference in its entirely.

BACKGROUND

The description herein relates to information handling systems having a battery.

As the value and use of information continue to increase, individuals and businesses seek additional ways to process and store information. One option available to users is information handling systems. An information handling system ("IHS") generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some situations, an IHS (e.g., a portable IHS such as a "laptop" or a notebook IHS) may increase or decrease its power requirement (e.g., system load). Such change (e.g., a sudden increase or decrease) in power requirement may cause various problems including problems associated with voltage fluctuations such as a voltage fall and/or a voltage overshoot.

SUMMARY

In a first embodiment, an information handling system ("IHS") includes a processor. The IHS also includes a power rail coupled to the processor. The power rail supplies power, from a power adapter, to the processor. The IHS further includes a battery, that in response to a voltage fall on the power rail, supplies supplemental power to the power rail.

In a second embodiment, an information handling system ("IHS") includes a processor. The IHS also includes a power rail coupled to the processor. The power rail supplies power, from a power adapter, to the processor. The IHS further includes a battery, that in response to a voltage rise on the power rail, suppresses power supplied by the power adapter to the power rail.

DETAILED DESCRIPTION

For purposes of this disclosure, an information handling system ("IHS") includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
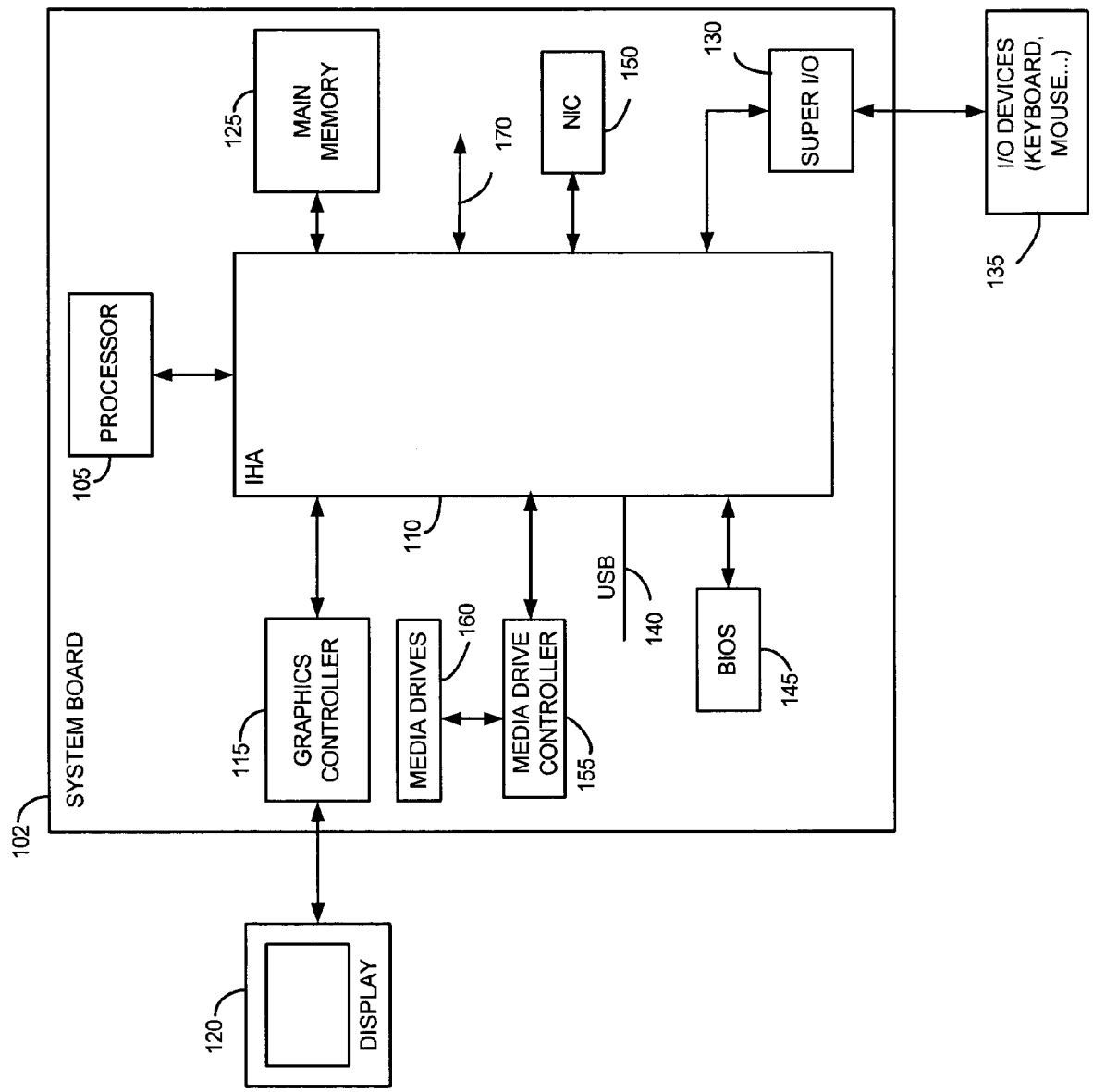
FIG. 1 is a block diagram of an information handling system, according to the illustrative embodiment.

FIG. 1 is a block diagram of an information handling system ("IHS"), according to the illustrative embodiment. The IHS 100 includes a system board 102. The system board 102 includes a processor 105 such as an Intel Pentium series processor or one of many other processors currently available. An Intel Hub Architecture (IHA) chipset 110 provides the IHS system 100 with graphics/memory controller hub functions and I/O functions. More specifically, the IHA chipset 110 acts as a host controller which communicates with a graphics controller 115 coupled thereto. A display 120 is coupled to the graphics controller 115. The chipset 110 further acts as a controller for main memory 125 which is coupled thereto. The chipset 110 also acts as an I/O controller hub (ICH) which performs I/O functions. A super input/output (I/O) controller 130 is coupled to the chipset 110 to provide communications between the chipset 110 and input devices 135 such as a mouse, keyboard, and tablet, for example. A universal serial bus (USB) 140 is coupled to the chipset 110 to facilitate the connection of peripheral devices to system 100. System basic input-output system (BIOS) 145 is coupled to the chipset 110 as shown. The BIOS 145 is stored in CMOS or FLASH memory so that it is nonvolatile.

A local area network (LAN) controller 150, alternatively called a network interface controller (NIC), is coupled to the chipset 110 to facilitate connection of the system 100 to other IHSs. Media drive controller 155 is coupled to the chipset 110 so that devices such as media drives 160 can be connected to the chipset 110 and the processor 105. Devices that can be coupled to the media drive controller 155 include CD-ROM drives, DVD drives, hard disk drives and other fixed or removable media drives. An expansion bus 170, such as a peripheral component interconnect (PCI) bus, PCI express bus, serial advanced technology attachment (SATA) bus or other bus is coupled to the chipset 110 as shown. The expansion bus 170 includes one or more expansion slots (not shown) for receiving expansion cards which provide the IHS 100 with additional functionality.

Figure 2:
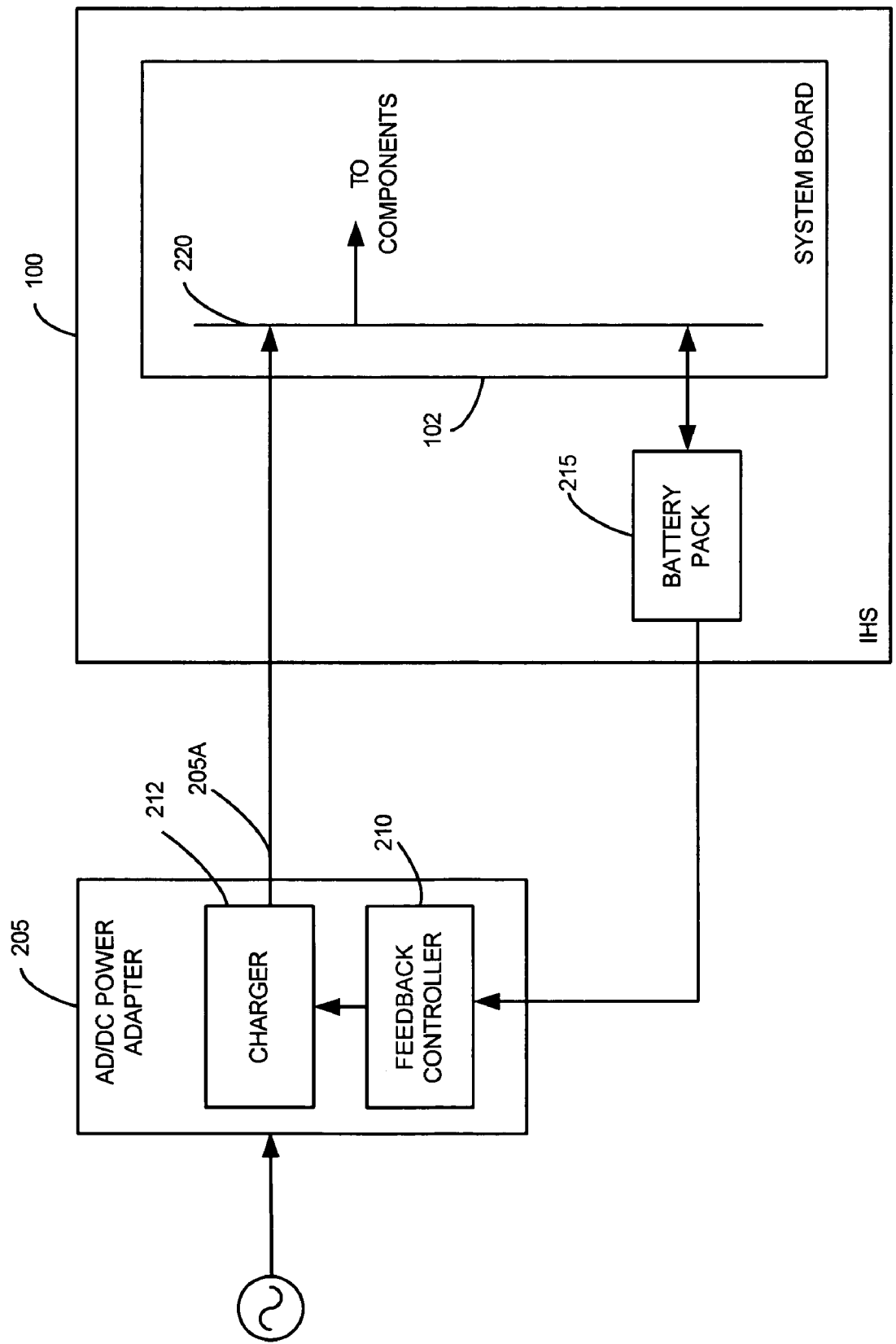
FIG. 2 is a block diagram of a power adapter coupled to the information handling system of FIG. 1, according to the illustrative embodiment.

FIG. 2 is a block diagram of a power adapter 205 coupled to the IHS 100 of FIG. 1, according to the illustrative embodiment. As shown, the power adapter 205 is coupled to the IHS 100, and supplies power to the IHS 100. More specifically, the power adapter 205 is capable of supplying power to a power rail 220, included by the system board 102 of the IHS 100. Such power is supplied by a charger 212, which is included by the power adapter 205. Also, the power rail 220 supplies power to one or more components (e.g., the processor 105, the IHA 110, and/or other components depicted in FIG. 1) of IHS 100. Accordingly, via the power rail 220, the power adapter 205 supplies power to the various components of the IHS 100.

In FIG. 2, the IHS 100 also includes a battery pack 215. The battery pack 215 is coupled to the power rail 220 and the power adapter 205. In addition to the power adapter 205, the battery pack 215 supplies power to the power rail 220. In one example, the IHS 100 is a portable IHS (e.g., a "notebook" computer and/or a personal digital assistant ("PDA")). In such example, the IHS 100 is capable of being powered by a power adapter (e.g., the power adapter 205) and/or a battery pack (e.g., the battery pack 215).

Moreover, the power adapter 205 is operable so that the power adapter 205 charges the battery pack 215. More specifically, in the illustrative embodiment, the charger 212, included by the power adapter 205, performs such charging operation. The power adapter 205 (or the charger 212) is capable of charging the battery pack 215 via power rail 220 while simultaneously supplying power to the IHS 100 via power rail 220. As shown in FIG. 2, the power adapter 205 includes a feedback controller 210 that is coupled to the charger 212. The feedback controller 210 is also coupled to the battery pack 215 and receives a signal that indicate the output voltage of battery pack 215.

In one example, in association with the power adapter 205 charging the battery pack 215 (e.g., by supplying an amount of current), the feedback controller 210 receives a feedback signal that indicates the battery pack 215's voltage, namely the battery pack 215's output voltage. In response to the feedback controller 210 receiving such feedback signal that indicates the present battery pack output voltage, power adapter 205 determines and outputs a charging voltage (e.g., voltage supplied by the charger 212) that is higher (e.g., slightly higher in one embodiment) than the present battery pack output voltage. The charging voltage supplied by adapter 205 at adapter output 205A is also referred to as the power rail voltage because it is supplied to the power rail for two purposes, namely to charge battery pack 215 and supply power to the IHS. In one example, the charging voltage applied to rail 220 is variable in response to an amount of current capable of being supplied by the power adapter 205, an amount of system load of the IHS 100, and the battery pack 215's capacity for receiving current from the power adapter 205. In one example, the "charging voltage" is maintained at a voltage level which is sufficiently larger than the battery pack output voltage to enable charging of the battery pack.

The power adapter 205 adjusts its voltage level so that the power rail 220's voltage level is slightly higher than the battery pack output voltage value that is fed back to feedback controller 210. The feedback controller 210 repeatedly receives the feedback signal, and the power adapter 205 repeatedly adjusts its output voltage at output 205A in response thereto, so that the power rail 220 voltage level is higher than the battery pack 215's voltage level while the battery pack 215 is charged. In at least one embodiment, the feedback controller 210 receives the feedback signal according to a digital periodic schedule (e.g., every 30 seconds). In another embodiment, the feedback controller 210 receives the feedback signal according to an analog time schedule, and such schedule is in real time.

Figure 3:
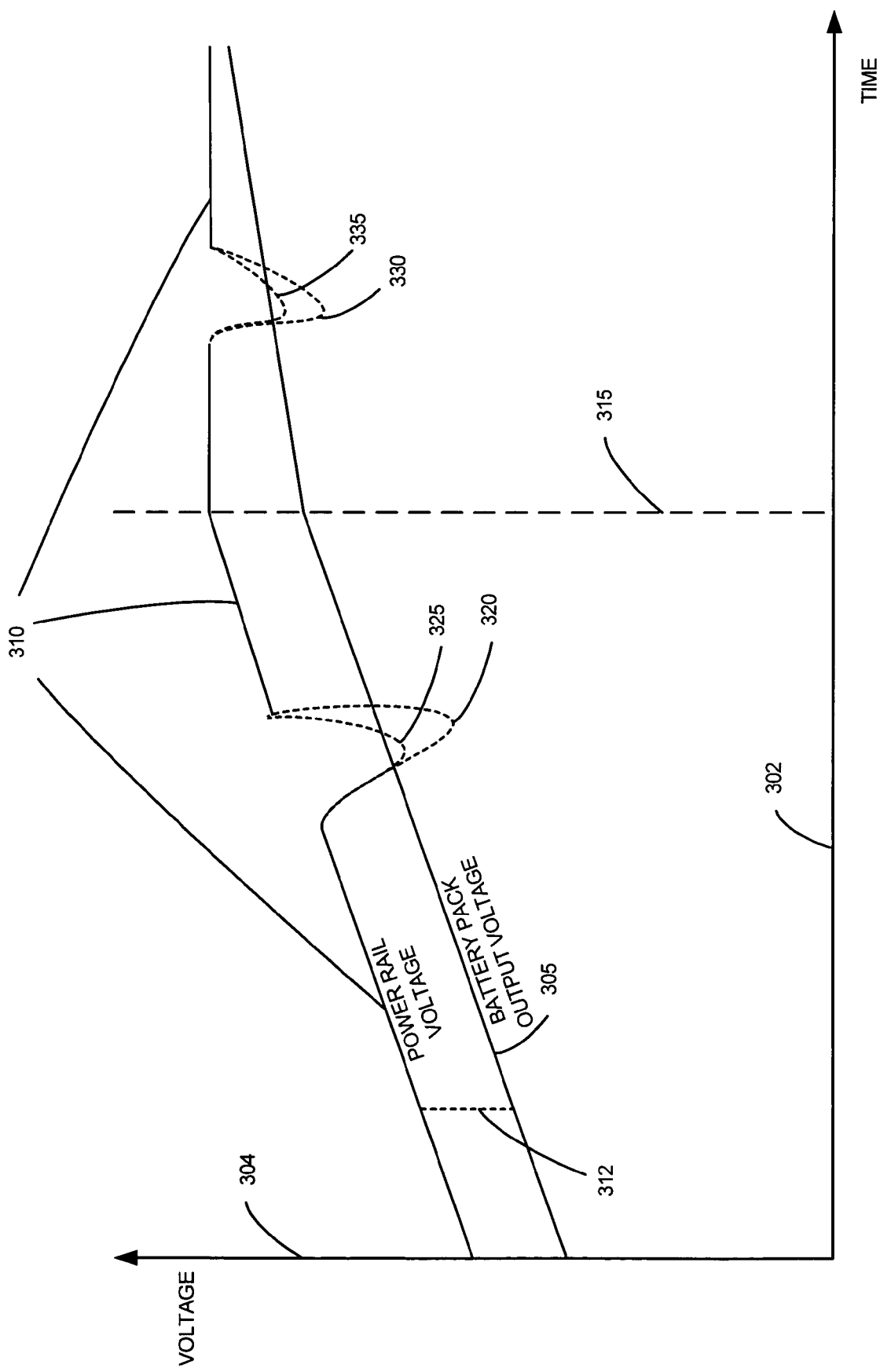
FIG. 3 is a voltage versus time graph illustrating voltage levels over time of a battery and a power rail of the information handling system of FIG. 2, according to the illustrative embodiment.

FIG. 3 is a voltage versus time graph illustrating voltage levels over time of the battery pack 215 and the power rail 220 of the IHS 100 of FIG. 2, according to the illustrative embodiment. The graph illustrates the relationship between time and voltage levels while the power adapter 205 charges the battery pack 215.

In the graph, a horizontal axis 302 represents a flow of time in the direction indicated by the arrow of the axis 302. The vertical axis 304 represents a level of voltage. A solid line 305 represents the battery pack 215's level of voltage ("battery pack output voltage") at various points in time. Similarly, a solid line 310 represents the power rail 220's voltage ("power rail voltage") level at various points in time.

As shown in FIG. 3, the battery pack output voltage 305 rises as it is charged by the power adapter 205. Accordingly, as discussed above in connection with FIG. 2, the power rail voltage 310 also rises. Moreover, until a time, indicated by a dashed line 315, the power rail voltage 310 remains at a level that is slightly higher than the voltage level 305. A difference between the power rail voltage 310 and the battery pack output voltage 305, at a given point in time, is substantially equal to the amount represented by a dashed line 312. As discussed above, in one example, such amount of difference 312 is previously determined.

Until the time 315, the power adapter 205 charges the battery pack 215, while supplying a substantially constant level of current to the battery pack 215. In the illustrative embodiment, the time 315 represents a time at which the battery pack 215 is substantially charged. Accordingly, after or at the time 315, the power adapter 205 maintains a substantially constant level of voltage for the voltage level 310, while reducing the level of current previously supplied to the battery pack 215. Although the voltage level 305 rises with passing of time as shown in FIG. 2, the voltage level 305 rises at a relatively slower rate compared to before the time 315.

In the IHS 100, if there is an increase (e.g., a sudden increase caused by applying a system load on the power rail 220) in power requirements on the power rail 220, the battery pack 215 is capable of supplying supplemental power in addition to the power supplied by the power adapter 205. In this way, the battery pack 215 is capable of decreasing an amount of voltage fall in the power rail 220 caused by the increase in power requirement.

In FIG. 3, a dotted line 320 represents an amount of voltage fall in the power rail 220 in an example situation in which there is an increase in power requirements on the power rail 220. In this example situation, a battery pack does not supply supplemental power to the power rail 220. Conversely, a dotted line 325 represents an amount of voltage fall in the power rail 220 in an otherwise similar situation in which the battery pack 215 supplies supplemental power to the power rail 220. As shown, the voltage fall 325 is relatively small compared to the voltage fall 320.

Likewise for times after the time 315, dotted line 330 represents an amount of voltage fall in the power in an example situation in which there is an increase in power required on the power rail 220. In the example situation, a battery pack does not supply supplemental power to the power rail 220. However, a dotted line 335 represents an amount of voltage fall in the power rail 220 in an otherwise similar situation in which the battery pack 215 supplies supplemental power to the power rail 220. Comparing the voltage fall 335 to the voltage fall 330, the voltage fall 335 is relatively small. Thus as shown in FIG. 3, in both situations where the power adapter 205 charges the battery in a constant current mode (e.g., before the time 315) and in a constant voltage mode (e.g., after the time 315), the battery is capable of reducing an amount of voltage fall by supplying supplemental power to the power rail 220.

Although in the above discussions, the battery pack 215 supplies supplemental power to reduce voltage falls, the battery pack 215 is also capable of reducing voltage rises (e.g., overshoots). In one example, in response to a decrease (e.g., a decrease caused by a sudden removal of load from the power rail 220) in power requirements from the power rail 220, the battery pack 215 is capable of suppressing (e.g., "sinking") power supplied to the power rail 220 to reduce a voltage overshoot on the power rail 220.

Figure 4:
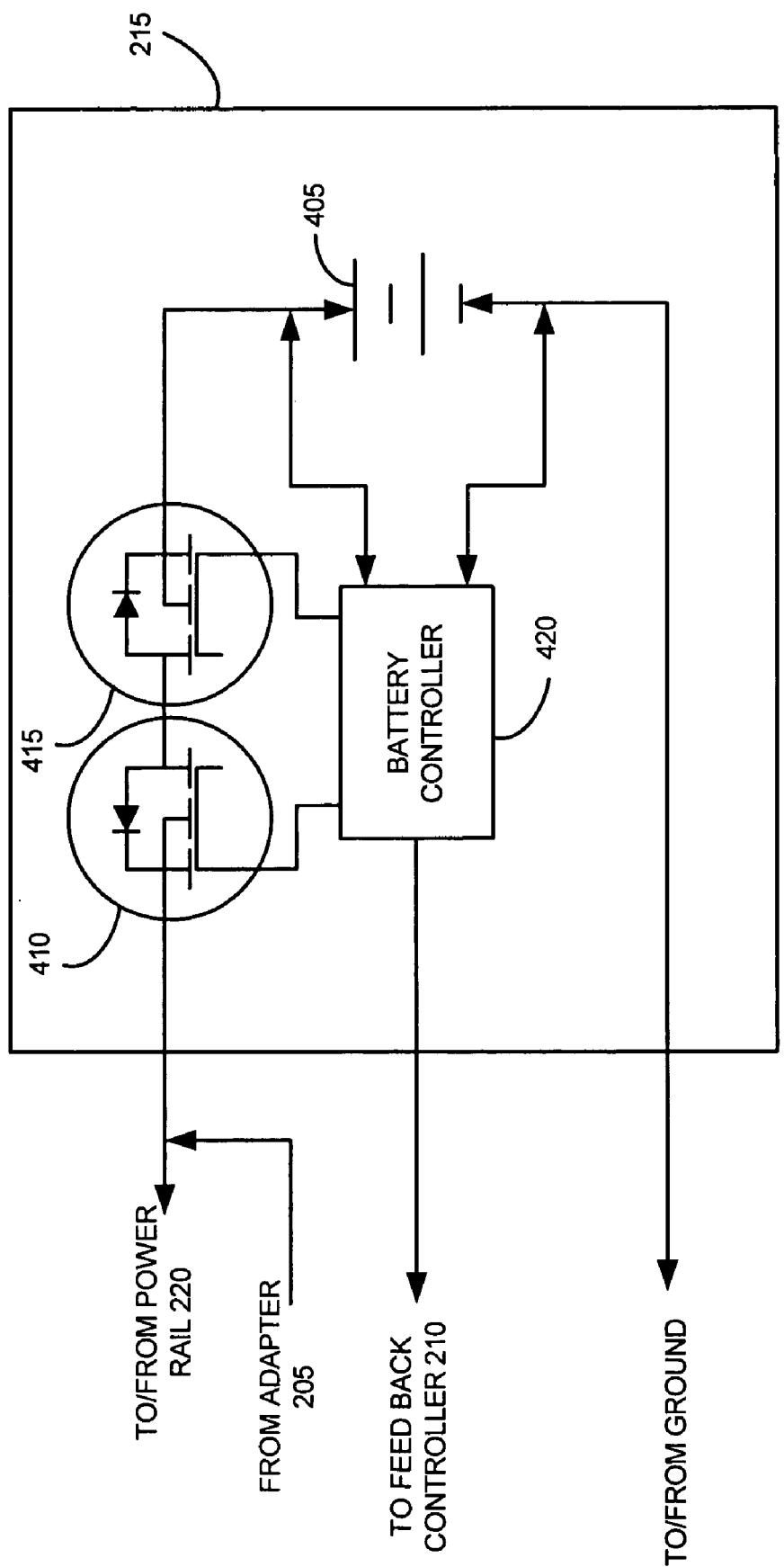
FIG. 4 is a block diagram of a battery pack included by the information handling system of FIG. 1, according to the illustrative embodiment.
Figure 5:
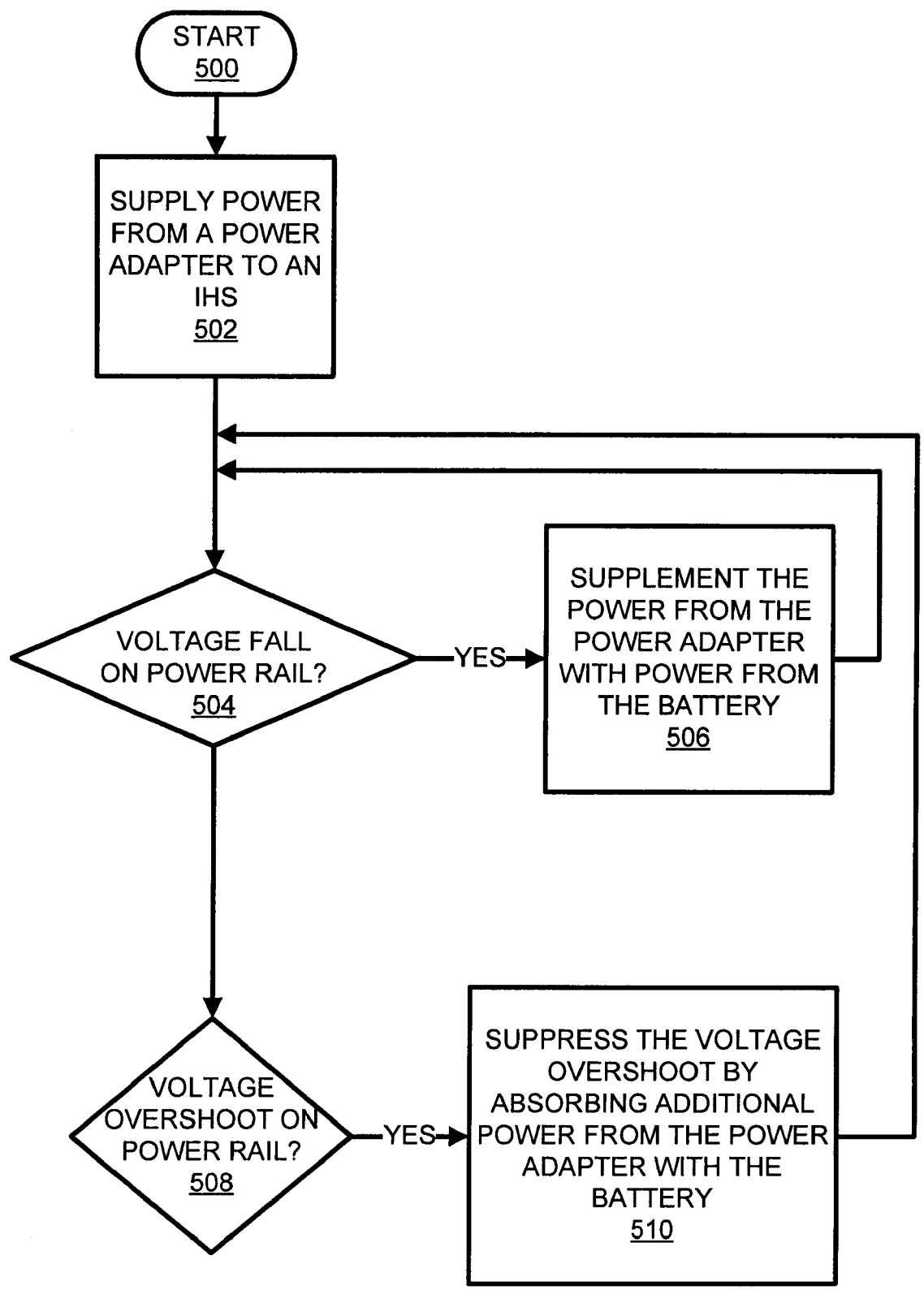
FIG. 5 is a flowchart according to an embodiment of a method to operate the information handling system of FIG. 1.

FIG. 4 is a block diagram of a battery pack 215 included by the IHS 100 of FIG. 1, according to the illustrative embodiment. The battery pack 215 includes a cell stack 405 having one or more cells (e.g., rechargeable battery cells such as Lithium ion battery cells) which are coupled to a battery controller 420. The battery controller 420 (e.g., a battery management unit) is coupled to the feedback controller 210 as shown. The battery pack 215 also includes a charge switch (e.g., a field effect transistor ("FET")) 410, which is coupled to the battery controller 420. Moreover, the battery pack 215 includes a discharge switch 415, substantially similar to the charge switch 410, coupled to the battery controller 420.

While the power adapter 205 charges the battery pack 215, the switch 410 is closed so that the batteries 405 are capable of receiving the charge currents. While charging the battery pack 215, the switch 415 is also closed so that the battery pack 215 is capable of supplying supplemental power to reduce voltage falls as discussed above (in connection with FIGS. 2 and 3).

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method comprising:
supplying power from a power adapter to an information handling system via a power rail, to simultaneously provide power to operate the information handling system and power to charge a battery pack coupled to the power rail; and
in response to a sudden voltage fall on the power rail caused by a sudden increase of a system load on the power rail during a normal operating condition, supplementing the power from the power adapter with power from the battery pack, wherein the battery pack includes a cell stack, a charge switch and a discharge switch coupled in series, and wherein the battery pack further includes a battery controller coupled to the power rail, the power adapter, the charge switch, the discharge switch and the cell stack.

2. The method of claim 1, wherein the voltage fall is caused by a sudden application of load on the power rail.

3. The method of claim 1, wherein charging the battery pack includes:
receiving a signal that indicates the battery pack's output voltage; and
in response to receiving the signal, adjusting a voltage supplied to the power rail.

4. The method of claim 3, wherein the adjusting includes:
adjusting so that the voltage supplied to the power rail is higher than the battery pack's output voltage.

5. The method of claim 1, wherein the charge switch and the discharge switch are closed while the battery is charged.

6. The method of claim 1, wherein charging the battery pack includes:
receiving a signal that indicates the battery pack's voltage; and
in response to receiving the signal, adjusting a voltage supplied to the power rail.

7. The method of claim 6, wherein the adjusting includes:
adjusting so that the voltage supplied to the power rail is higher than the battery pack's voltage.

8. An information handling system comprising:
a processor;
a power rail, coupled to the processor, that supplies power, from a power adapter, to the processor; and
a battery pack, coupled to the power rail and the power adapter for charging from the power adapter while the power adapter supplies power to the processor that in response to a sudden voltage fall on the power rail, caused by a sudden increase of a system load on the power rail during a normal operating condition, supplies supplemental power to the power rail, wherein the battery pack includes a cell stack, a charge switch and a discharge switch coupled in series, and wherein the battery pack further includes a battery controller coupled to the power rail, the power adapter, the charge switch, the discharge switch and the cell stack.

9. The information handling system of claim 8, wherein the voltage fall is caused by a sudden application of load on the power rail.

10. The information handling system of claim 8, wherein charging the battery pack includes:
receiving a signal that indicates the battery pack's voltage; and
in response to receiving the signal, adjusting a voltage supplied to the power rail.

11. The information handling system of claim 10, wherein the adjusting includes:
adjusting so that the voltage supplied to the power rail is higher than the battery pack's voltage.

12. The information handling system of claim 8, wherein the charge switch and the discharge switch are closed while the battery pack is charged.

13. The information handling system of claim 8, wherein charging the battery pack includes:
receiving a signal that indicates the battery pack's voltage; and
in response to receiving the signal, adjusting a voltage supplied to the power rail.

14. The information handling system of claim 13, wherein the adjusting includes:
adjusting so that the voltage supplied to the power rail is higher than the battery pack's voltage.

* * * * *